(12) United States Patent
Lv et al.

(10) Patent No.: US 10,346,238 B2
(45) Date of Patent: Jul. 9, 2019

(54) DETERMINING FAILURE LOCATION IN A STORAGE SYSTEM

(71) Applicant: EMC Corporation, Hopkinton, MA (US)

(72) Inventors: Man Lv, Beijing (CN); Chris Zirui Liu, Beijing (CN); Colin Yong Zou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 30 days.

(21) Appl. No.: 14/867,153

(22) Filed: Sep. 28, 2015

(65) Prior Publication Data

US 2016/0092292 A1 Mar. 31, 2016

(30) Foreign Application Priority Data

Sep. 30, 2014 (CN) .......................... 2014 1 0527596

(51) Int. Cl.
| | |
|---|---|
| *G06F 11/00* | (2006.01) |
| *G06F 11/07* | (2006.01) |
| *G06F 11/30* | (2006.01) |
| *G06F 11/34* | (2006.01) |

(52) U.S. Cl.
CPC ........ *G06F 11/079* (2013.01); *G06F 11/0727* (2013.01); *G06F 11/0751* (2013.01); *G06F 11/3034* (2013.01); *G06F 11/3409* (2013.01)

(58) Field of Classification Search
CPC . G06F 11/0727; G06F 11/079; G06F 11/0751
See application file for complete search history.

(56) References Cited

U.S. PATENT DOCUMENTS

| | | | | |
|---|---|---|---|---|
| 7,103,652 | B1* | 9/2006 | Dobberpuhl | G06F 17/302 |
| | | | | 707/E17.032 |
| 7,624,305 | B2* | 11/2009 | De Araujo | G06F 11/0727 |
| | | | | 714/25 |
| 8,949,863 | B1* | 2/2015 | Coatney | G06F 11/079 |
| | | | | 714/43 |

(Continued)

FOREIGN PATENT DOCUMENTS

| | | |
|---|---|---|
| CN | 101127233 A | 2/2008 |
| CN | 102521090 A | 6/2012 |
| CN | 103955417 A | 7/2014 |

*Primary Examiner* — Marc Duncan
*Assistant Examiner* — Jonathan D Gibson
(74) *Attorney, Agent, or Firm* — BainwoodHuang (57) ABSTRACT

Embodiments of the present disclosure provide a method, a computer program product and an apparatus for determining a failure location in a storage system by obtaining performance information of a disk; in response to the performance information indicating that at least one or more performance indices exceed a corresponding predetermined threshold, determining whether a health condition of the disk is normal based on at least one or more performance indices; and in response to determining that the health condition of the disk is normal, determining a failure location based on the health condition information of at least one or more elements in a communication path of the disk, and it may be diagnosed whether a failure occurs to the disk per se or in its communication path, and before a potential failure occurs to the disk, it may also predict the failure thereby preventing data loss.

19 Claims, 6 Drawing Sheets

(56) References Cited

U.S. PATENT DOCUMENTS

| | | | | |
|---|---|---|---|---|
| 2002/0091965 A1* | 7/2002 | Moshayedi | ............ | G06F 11/004 714/6.13 |
| 2005/0044454 A1* | 2/2005 | Moshayedi | ............ | G06F 11/004 714/54 |
| 2005/0246591 A1* | 11/2005 | Johnson | ................. | G11B 19/04 714/47.2 |
| 2007/0079170 A1* | 4/2007 | Zimmer | ................ | G06F 11/008 714/6.23 |
| 2009/0265577 A1* | 10/2009 | Haramai | ............. | H04L 41/0677 714/3 |
| 2011/0283150 A1* | 11/2011 | Konishi | .............. | G06F 11/0727 714/42 |
| 2014/0337665 A1* | 11/2014 | Ogihara | ............. | G06F 11/1092 714/6.21 |

\* cited by examiner

DETERMINING FAILURE LOCATION IN A STORAGE SYSTEM

RELATED APPLICATION

This application claims priority from Chinese Patent Application Number CN201410527596.0 filed on Sep. 30, 2014 entitled "METHOD AND APPARATUS FOR DETERMINING A FAILURE POSITION IN A STORAGE SYSTEM," the content and teachings of which is herein incorporated by reference in its entirety.

FIELD OF THE INVENTION

Embodiments of the present disclosure relate to the field of a storage system.

BACKGROUND OF THE INVENTION

With the development of computer technologies, handling hard disk failures in a storage system may be a relevant research area. Generally, common problems in the area of failure handling may be on how to determine a hard disk failure, how to predict a hard disk failure to prevent data loss, etc. Typically, known methods may always depends on systems like RAID, which may notify the system of a disk error when a disk read/write fails. However, besides a disk, the storage system may generally include a plurality of structures or elements for connecting the disk; disk read/write error may be also incurred in all likelihood by failure of a certain element in a connection structure, rather a failure of a disk per se, which, however, may not be identified by RAID in most cases, and the RAID may still report to the system that disk failure occurs. Typically, failure of a connection element may be misjudged as a disk failure, and thus the disk may be replaced, and may result in causing unnecessary waste.

SUMMARY OF THE INVENTION

Embodiments of the present disclosure provide a system, a computer program product and a method for determining a failure location in a storage system by obtaining performance information of the disk; in response to the performance information indicating that one or more performance indices exceed corresponding predetermined thresholds, and performing the following operations: determining whether a health condition of the disk is normal at least based on one or more performance indices; and in response to determining that the health condition of the disk is normal, determining a failure location based on health condition information of one or more elements on a communication path of the disk.

BRIEF DESCRIPTION OF THE DRAWINGS

The above and other features, advantages and aspects of respective embodiments of the present disclosure will become more obvious by making references to the following detailed descriptions in conjunction with the accompanying drawings. In the accompanying drawings, the same or similar references refer to the same or similar elements, in which.

DETAILED DESCRIPTION

Hereinafter, embodiments of the present disclosure will be described in detail with reference to the accompanying drawings. Although some embodiments of the present disclosure have been displayed in the accompanying drawings, it should be understood that the present disclosure can be implemented in various forms, rather than being limited by embodiments described here. On the contrary, providing these embodiments is to make the present disclosure understood more thoroughly and completely, and to communicate the scope of the present disclosure completely to those skilled in the art.

In some embodiment, current solutions do not provide a method that may be able to predict a disk failure effectively, and may thereby make it possible to take necessary measures before occurrence of the disk failure so that data loss may be avoided.

Embodiments of the present disclosure provide a system, a computer program product and a method for determining a failure location in a storage system by obtaining performance information of the disk. In one embodiment, performance information indicating that one or more performance indices may have exceeded corresponding predetermined thresholds may be determined. In a further embodiment, the following operations may be performed:

a. determining whether a health condition of a disk may be normal at least based on one or more performance indices; and b. in response to determining that the health condition of the disk may be normal, determining a failure location based on health condition information of one or more elements on a communication path of the disk.

In a further embodiment, determining a failure location based on health condition information of one or more elements on a communication path of the disk may include obtaining health condition information of elements on the communication path in sequence. Yet a further embodiment may include that in response to a health condition information of one element on the communication path that may be abnormal, determining an element that may have failed.

In a further embodiment, determining whether a health condition of a disk may be normal at least based on one or more performance indices may include that when one or more performance indices may be irrelevant to a health condition of a disk, and a health condition information of the disk may be normal, determining a health condition of a disk as normal. In a further embodiment, when one or more performance indices may be associated with a health condition of a disk, and/or a health condition information of a disk may be abnormal, a health condition of a disk may be determined abnormal. In a further embodiment it may be determined that the disk may have failed.

In a further embodiment, the method may be periodically executed, or may be manually triggered, or may be triggered in response to detection of I/O performance abnormality of a disk, or triggered in response to reception of the information reporting a disk I/O failure. In a further embodiment, a disk I/O error information may be reported by a disk array RAID.

In a further embodiment, performance indices may include one or more of the following: an I/O error count, an average I/O delay, a data error, a reallocated sector count, a SAS G-list count, and a SAS background media scan information.

In a further embodiment, a health condition information may include historical health condition information and/or current health condition information.

In a further embodiment, a health condition information may be reported through a Self-Monitoring Analysis and Reporting Technology (S.M.A.R.T).

According to another aspect of the disclosure, there may be provided an apparatus for determining a failure location in a storage system. In a further embodiment, an obtaining unit may be configured to obtain performance information of the disk. In a further embodiment, a failure diagnostic unit may be configured to, in response to the performance information indicating that one or more performance indices exceed corresponding predetermined thresholds, perform the following operations: determining whether a health condition of the disk may be normal at least based on one or more performance indices. In yet a further embodiment, in response to determining that the health condition of the disk may be normal, determining a failure location based on health condition information of one or more elements on a communication path of the disk.

In an alternative embodiment, a failure diagnostic unit may be further configured to: obtain health condition information of elements on the communication path in sequence. In yet a further embodiment, in response to the health condition information of one element on the communication path may be abnormal, determine that one element may fail.

In an alternative embodiment, a failure diagnostic unit may be further configured to: when one or more performance indices are irrelevant to the health condition of the disk, and the health condition information of the disk may be normal, determine the health condition of the disk may be normal. In a further alternative embodiment, a failure diagnostic unit may be further configured to: when one or more performance indices are associated with the health condition of the disk, and/or the health condition information of the disk may be abnormal, determine the health condition of the disk abnormal, and may determine that the disk fails.

In an alternative embodiment, an apparatus may periodically executed, manually triggered, triggered in response to detection of I/O performance abnormality of the disk, or triggered in response to reception of the information reporting the disk I/O failure. In a further alternative embodiment, a disk I/O error information may be reported by a disk array RAID.

In an alternative embodiment, performance indices may include one or more of the following: I/O error count, average I/O delay, data error, reallocated sector count, SAS G-list count, and SAS background media scan information.

In an alternative embodiment, health condition information may include historical health condition information and/or current health condition information.

In an alternative embodiment, health condition information may be reported through Self-Monitoring Analysis and Reporting Technology (S.M.A.R.T).

Based on the embodiments of the present disclosure, when abnormal access to the disk occurs, it may be configured to clear whether a failure occurs to the disk per se or on its communication path; before a potential failure occurs, the failure may be predicted so as to prevent data loss.

Figure 1:
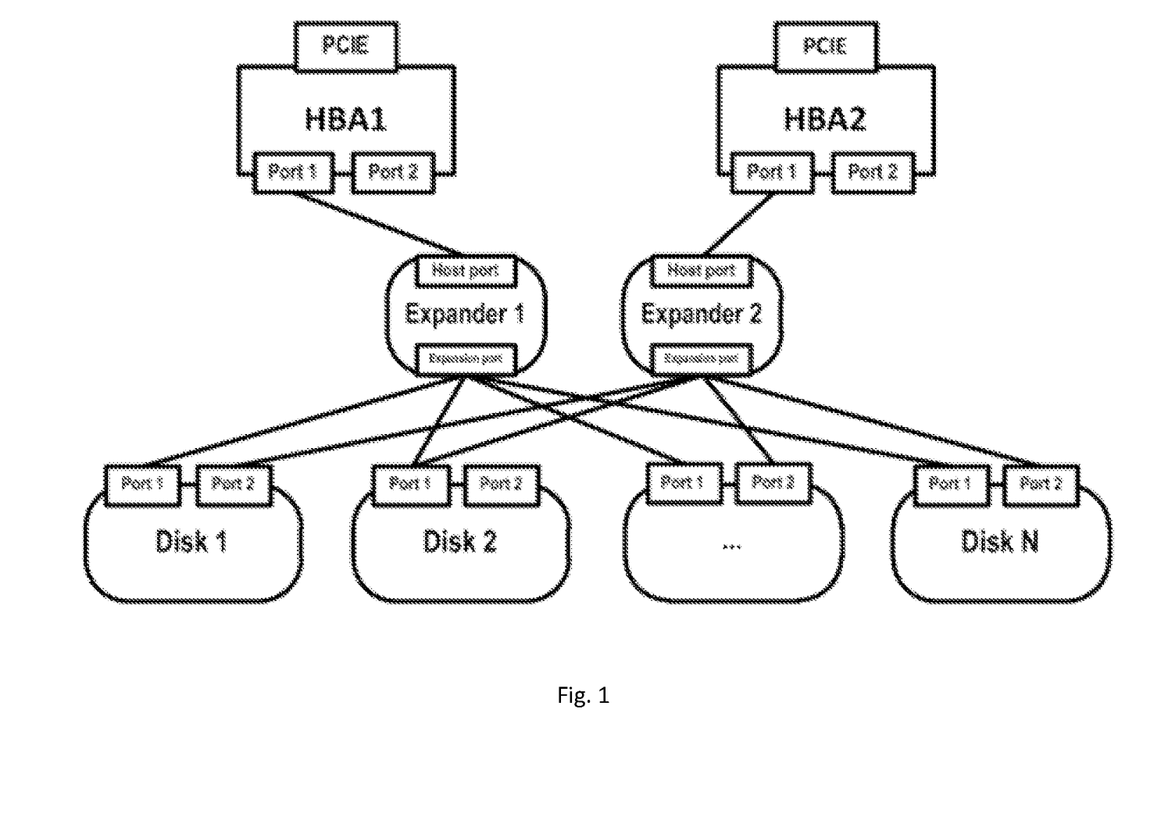
FIG. 1 shows a schematic diagram of an exemplary storage system backend connection structure adapted to implement the embodiments of the present disclosure.

FIG. 1 shows a schematic diagram of an exemplary storage system backend connection structure adapted to implement the embodiments of the present disclosure. Those skilled in the art should understand that the connection structure shown in FIG. 1 is only exemplary, which should not bring any limitation to the function and scope of use of the embodiments of the present invention.

As shown in FIG. 1, a typical storage system connection may comprise: a PCIE bus, a host bus adapter HBA, expanders, and disks, which are coupled (connected) in sequence, wherein the HBA may comprise a plurality of ports connected to the expander, while the expander further comprises a plurality of ports connected to a plurality of disks. It is easy to understand that failure of any node (e.g., the disk per se, ports, expansion ports, expander, host ports, HBA ports, and PCIE, etc.) in respective nodes as shown in FIG. 1 could arouse failure of a disk I/O operation. In other words, when a report of failure of disk I/O operation is received from a disk management system such as RAID, it may be hard to determine that it is indeed a failure of the disk per se, or a failure occurring to one or more nodes in its connection structure. As stated above, FIG. 1 is only a specific example for purpose of illustration. In a practical storage environment, the disk may be more likely connected to the system via various components, including, but not limited to: paddle card, cable, expander, HBA, PCIE, etc., and various software stacks in the OS to help access the disk (HBA driver, SCSI driver, block layer, etc.), and failure to any element in the communication chain would cause inaccessibility to the disk.

In order to solve this problem, embodiments of the present disclosure provide a novel solution of determining whether failure may occur in a storage system, and determining a failure location when the failure may occur or may be likely to occur. It should be noted that the term "disk" used herein may include a solid state disk (SSD disk), a mechanical disk (HDD disk), a hybrid disk (SSHD disk), or other similar storage devices. The scope of the present disclosure is not limited in this aspect. The disk may be a part of a storage system of a computer, a server, or other computing devices.

Figure 2:
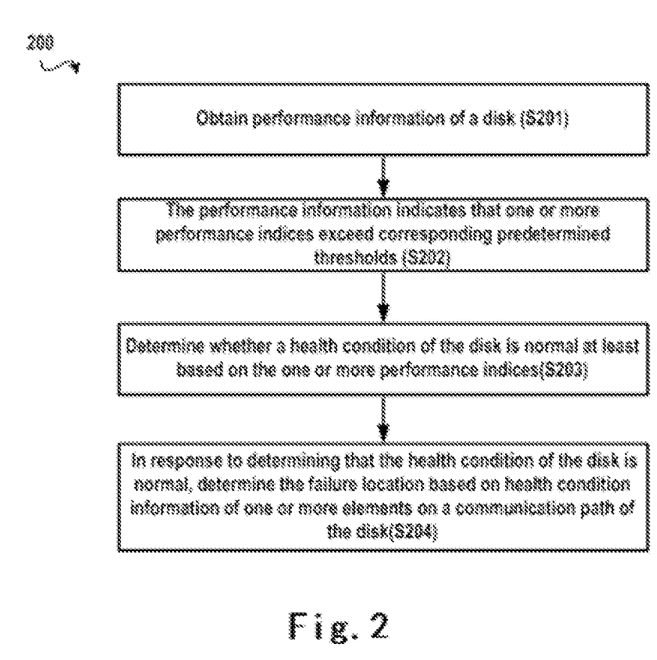
FIG. 2 shows an exemplary method 200 for determining a failure location in a storage system according to the embodiments of the present disclosure.

FIG. 2 shows an exemplary method 200 for determining a failure location in a storage system according to embodiments of the present disclosure. According to the method 200, in step S201, performance information of the disk is obtained. In one embodiment, performance information of a disk may involve information regarding throughput, delay and other aspects. In a further embodiment, such performance information may be kept in a register and collected periodically by a component such as a monitor.

Referring FIG. 2 again, next, the method 200 proceeds to step S202, in response to the performance information indicating that one or more performances exceed a corresponding predetermined threshold, and subsequently perform step S203—of determining whether a health condition of the disk is normal at least based on the one or more performance indices, and subsequently performing step S204—in response to determining a health condition of the disk as normal, determine the failure location based on health condition information of one or more elements on a communication path of the disk.

In an exemplary embodiment, typical performance indices in the performance information may include: count of I/O error (I/O correctness data), average I/O delay, data error (e.g., detected by a RAID and file system), reallocated sector count (e.g., SATA reallocated sector count), SAS G-list (list of bad tracks of the hard disk) count, SAS background media scan BMS information (including, but not limited to, the media error count detected by BMS, BMS log count, etc.), and may not be limited to the above exemplary list. In a further embodiment, corresponding thresholds may be set in advance for these performance indices, respectively. In a further embodiment, in practice, if a set threshold may be close to the ultimate value of the disk performance and a performance index exceeds the set threshold, it usually indicates that the disk or the associated connection structure may have failed. In an alternate embodiment, the threshold may be set relatively loosely, then when the performance index exceeds the threshold, this may be used to predict a potential disk failure. In a further embodiment, when one or more of performance indices exceed the thresholds, a determining process for the failure location may be activated (as illustrated in step 203 and step 204.)

In one embodiment, first, whether the health condition of the disk is normal (as shown in step S203) may be determined at least based on the one or more performance indices. In a further embodiment, the health condition of the disk being normal, for example, may include two levels of meanings: (1) one or more performance indices exceeding the thresholds may be irrelevant to the health condition of the disk; and (2) the health condition information of the disk per se may have nothing abnormal. In an exemplary embodiment, in the above listed performance indices, the reallocated sector count, SAS G-list count, and SAS background media scan BMS information may be regarded as strongly associated with the disk media, i.e., they may be regarded as associated with the health condition of the disk per se. if the three indices exceed the thresholds, it may very likely regarded that the health condition of the disk may be abnormal. In an alternative embodiment, the health condition information of the disk may be retrieved, which, in conjunction with whether the health condition information may be abnormal, jointly determines whether the health condition of the disk may be abnormal. In a further embodiment, health condition information of the disk may be derived through, for example, the Self-Monitoring Analysis and Reporting Technology called S.M.A.R.T. In a further embodiment, besides, the health condition information may include the historical health condition information and/or current health condition information. In a further embodiment, it may be noted that S.M.A.R.T is only an example of a tool providing disk health condition information, and other available tools that may be applied here to perform similar analysis. In one embodiment, generally, if either of (1) and (2) is not satisfied, it may be likely determined that the health condition of the disk may be abnormal, thereby directly determining that the disk per se may fail. In an alternate embodiment, if (1) and (2) are both satisfied, it may be determined that the health condition of the disk may be normal. In a further embodiment if the health condition of the disk is determined normal, the failure (if present) may very likely exists in one or more elements in the disk communication path. In a further embodiment, the failure location may be determined (as shown in step S204) based on the health condition information of one or more elements on the communication path of the disk (and will be illustrated in conjunction with the description of FIG. 3.)

Figure 3:
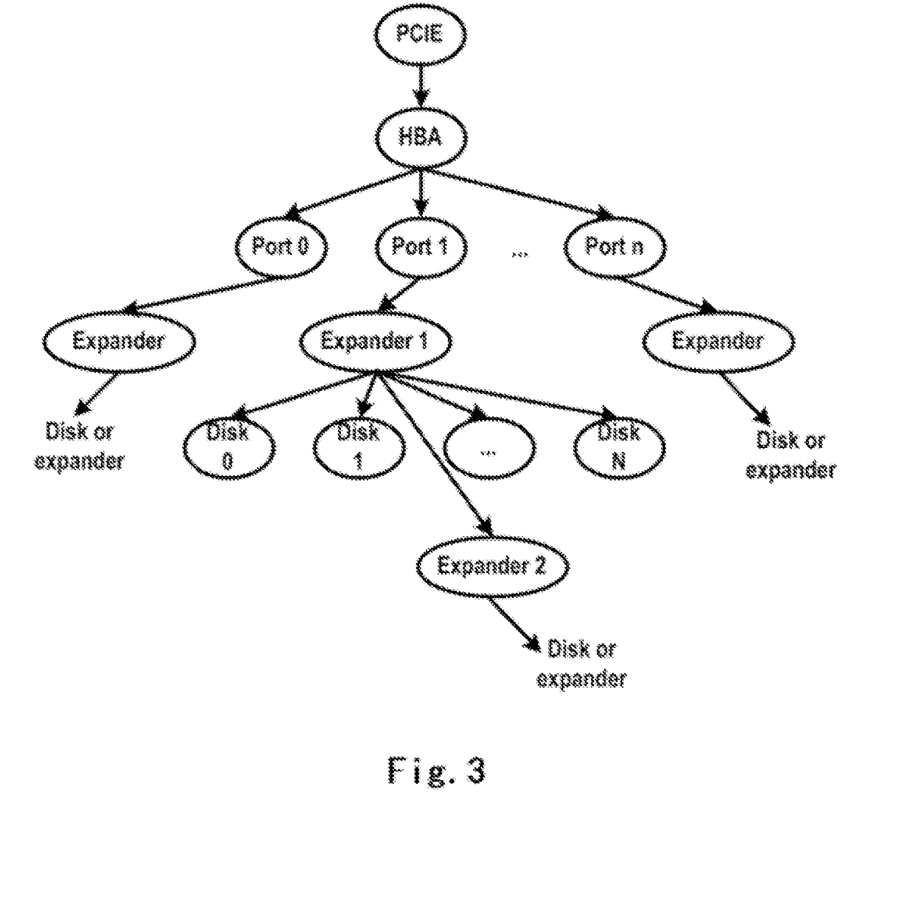
FIG. 3 shows an exemplary schematic hierarchical topological graph of a storage system backend connection structure adapted to implement the embodiments of the present disclosure.

FIG. 3 shows a schematic hierarchical topological graph of an exemplary storage system backend connection structure adapted to implement the embodiments of the present disclosure. Those skilled in the art should understand, dependent on the difference in the backend connection structure of a real storage system, the topological graph may also change, and the present disclosure has no limitation in this aspect. The hierarchical topological graph as shown in FIG. 3 may be generated upon setup of the storage system and may be updated with occurrence of a hot plug event at any time (e.g., disk addition/removal, a new expander being added to the connection, etc.).

Refer to FIG. 3 to review the method shown in FIG. 2. In one embodiment, after obtaining the performance information of each disk (including disks 0-N) in turn, suppose the performance information of disk 0 indicates that its performance index "reallocated sector count" may have exceeded the threshold by a large margin, since the reallocated sector count is regarded as relevant to the health condition of disk 0, it may be assumed that the health condition of the disk per se is abnormal, i.e., determined that disk 0 per se may have failed. In another embodiment, if the performance information of disk 0 indicates that it is not the reallocated sector count indicator, but it may be the I/O error count that exceeds the threshold; since the I/O error count is regarded as not to be directly associated with the health condition of disk 0, while the health condition information of the disk per se as obtained through S.M.A.R.T may not found to be abnormal, it may then be considered that a certain element on the communication path (e.g., a directional path from disk 0, through expander 1, port 1, HBA, to PCIE in FIG. 3) of disk 0 may have failed. In a further embodiment, in order to judge the location of the failure, a preferred method may be obtaining the health condition information of the elements on the connection path in sequence, and in response to the health condition information of an element on the communication path being also abnormal, determining that one element may have failed.

Reference is made to FIG. 3, where in implementation, as shown, (a) first check the health condition information of the parent node (i.e., expander 1) of disk 0; (b) if the information indicates that the health condition of the disk parent node (expander 1) is abnormal, it is determined that the parent node fails, and the subsequent steps will not be executed; (c) otherwise, if the information indicates that the health condition of the parent node is normal, then the health condition information of a parent node (port 1 in FIG. 3) for the parent node along the directional path is obtained continuously. Repeat steps (b) and (c), till a node with an abnormal health condition is found, and then determine the location where the failure occurs; and then the diagnostic process ends. Alternatively, if no node with an abnormal health condition is found after traversing the path, it is assumed that no failure occurs on this path. Similarly, the health condition information of an element also includes historical health condition information and/or current health condition information.

In one embodiment, the method 200 of FIG. 2 has been exemplarily illustrated above with reference to FIG. 3. In a further embodiment, it may be seen that the method for determining a failure location may clearly diagnose whether a failure occurs to the disk per se or on its communication path when an abnormal access to the disk occurs, and before a potential failure occurs to the disk, it may also predict the failure thereby preventing data loss.

In a further embodiment, during application, the method 200 may be triggered in many situations. In an exemplary embodiment, the method 200 may be triggered in response to detection of I/O performance abnormality of the disk (e.g., the I/O speed apparently slows), or in response to reception of information reporting a disk I/O error (by a disk management system such as RAID). In an alternate embodiment, the method 200 may also be manually triggered by an administrator or a user, or executed periodically.

Next, the apparatus 400 for predicting and determining a failure location in a storage system according to exemplary embodiments of the present invention will be further described with reference to FIG. 4.

Figure 4:
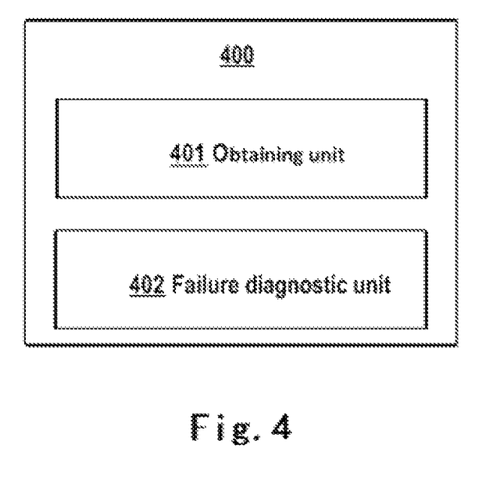
FIG. 4 shows an exemplary schematic block diagram of an apparatus predicting and determining a failure location in a storage system according to the embodiments of the present disclosure.

As shown in the FIG. 4, the apparatus comprises an obtaining unit 401 configured to obtain performance information of a disk; and a failure diagnostic unit 402 is configured to perform, in response to the performance information indicating one or more performance indices exceeding a corresponding predetermined threshold, the following operations: to determine whether a health condition of the disk is normal based on at least one or more performance indices; and in response to determining that the health condition of the disk being normal, to determine the failure location based on health condition information of one or more elements on a communication path of the disk. Alternatively failure detection unit 400 may be configured to perform the task of obtaining unit 401 and failure diagnostic unit 401, providing the same end results.

In an alternative embodiment, the failure diagnostic unit may be further configured to obtain health condition information of elements on the communication path in sequence; and in response to the health condition information of one element on the communication path being abnormal, determining that one element may fail.

In an alternative embodiment, the failure diagnostic unit may be further configured to: when the one or more performance indices being irrelevant to a health condition of the disk and the health condition information of the disk may have nothing abnormal, determine the health condition of the disk to be normal. In a further alternative embodiment, the failure diagnostic unit may be further configured to: when the one or more performance indices are relevant to the health condition of the disk, and/or the health condition information of the disk is abnormal, determine the health condition of the disk may be abnormal, and determine that the disk may fail.

In an alternative embodiment, the apparatus may be periodically triggered, manually triggered, triggered in response to detection of I/O performance abnormality of the disk, or triggered in response to reception of information reporting the disk I/O error. In a further alternative embodiment, the information of the disk I/O error may be reported by a disk array RAID.

In an alternative embodiment, the performance indices may include one or more of the following: count of I/O error, average I/O delay, data error, reallocated sector count, SAS G-list count, and SAS background media scan BMS information.

In an alternative embodiment, the health condition information may include historical health condition information and/or current health condition information.

In an alternative embodiment, the health condition information may be obtained through a Self-Monitoring Analysis and Reporting Technology S.M.A.R.T of a disk.

Figure 5:
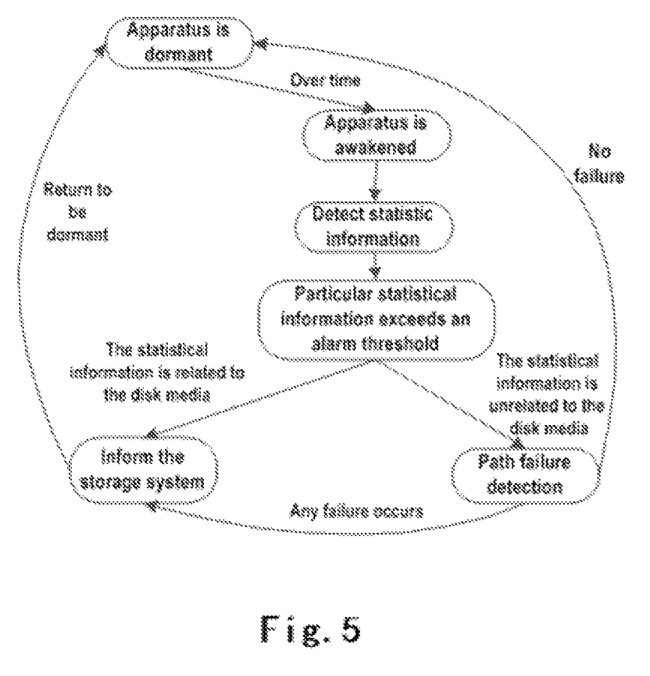
FIG. 5 shows an exemplary status flow diagram of an apparatus for predicting and determining a failure location in a storage system according to the embodiments of the present disclosure.

FIG. 5 shows a state flow diagram of an apparatus of FIG. 4 for predicting and determining a failure location in an exemplary storage system according to the embodiments of the present disclosure. As shown in FIG. 5, the apparatus may be in a dormant state in advance, and is awakened in the case of overtime, or the RAID reporting a disk read/write error, or detecting I/O performance abnormality of the disk, or manual control by the administrator, and then starts diagnosing whether the storage system has a failure and the location of the failure. As shown in FIG. 5, and as described above in detail, whether a disk per se fails or a path connected thereto fails is determined by obtaining statistical data such as performance information of the disk and determining whether the performance information exceeds a corresponding predetermined threshold, or based on other conditions that can be used for the determining process. In case of the disk per se failing, the storage system is notified, and the apparatus returns to the dormant state. In case of the connected path failing, a diagnostic process on the failure location is initiated (as mentioned above with reference to the description of FIG. 2 and FIG. 3) to determine a specific element on the communication path that fails. Similarly, the storage system is notified when finding a failure element, and the apparatus is caused to return to the dormant state. If no failure element is found, the apparatus directly returns to the dormant state.

Figure 6:
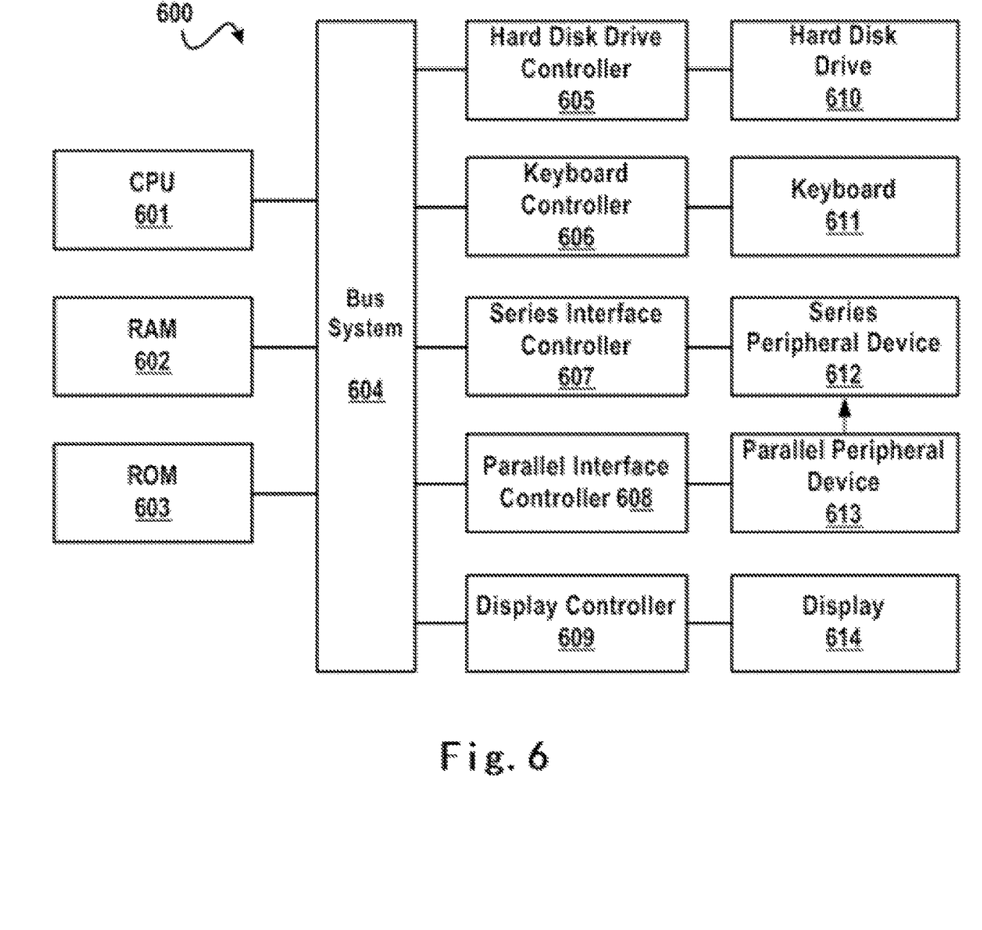
FIG. 6 shows an exemplary block diagram of an exemplary computing system 600 adapted to implement the embodiments of the present disclosure.

FIG. 6 illustrates a structural block diagram 600 of an exemplary computer device that may implement embodiments according to the present disclosure. As illustrated in FIG. 6, the computer system 600 comprises CPU (Central Processing Unit) 601, RAM (Random Access Memory) 602, ROM (Read Only Memory) 603, system bus 604, hard disk controller 605, keyboard controller 606, serial interface controller 607, parallel interface controller 608, display controller 609, hard disk 610, keyboard 611, serial peripheral device 612, parallel peripheral device 613 and display monitor 614. Among these components, connected to system bus 604 are CPU 601, RAM 602, ROM 603, hard disk controller 605, keyboard controller 606, serial interface controller 607, parallel controller 608 and display controller 609. Hard disk 610 is connected to hard disk controller 605; keyboard 611 is connected to keyboard controller 606; serial peripheral device 612 is connected to serial interface controller 607; parallel peripheral device 613 is connected to parallel interface controller 608; and monitor 614 is connected to monitor controller 609. It should be understood that the structural block diagram in FIG. 6 is illustrated only for illustration purpose, and is not intended to limit the scope of the disclosure. In some embodiment, some other devices may be added or removed as required.

In one embodiment, the disclosure may be implemented as a system, a method, or a computer program product. In a further embodiment, the embodiments of this disclosure may be specifically embodied in the following forms: full hardware, full software, or a combination of hardware and software. In some other embodiments, these may be embodied as a computer program product in one or more computer-readable medium, and this computer readable medium may include computer readable code.

In one embodiment, any combination of one or more computer readable mediums may be employed. In a further embodiment, the computer readable medium may be a computer readable signal medium or a computer readable storage medium. In an exemplary embodiment, the computer readable medium, may be, but not limited to, an electric, magnetic, optical, electromagnetic, infrared, or semiconductor system (apparatus or device), or any combination of the above. In a further embodiment, more specific examples of the computer-readable medium (non-exhaustive list) may include: an electrical connection having one or more wires; a portable computer disk, a hard disk, a random access memory (RAM), a read only memory (ROM), an Erasable Programmable Read Only Memory (EPROM or flash disk), an optical fiber, a compact disc read-only memory (CD-ROM), an optical memory device, a magnetic memory device, or any appropriate combination of the above. In an embodiment of the present disclosure, the computer readable memory medium may be any tangible medium including or storing a program. In a further embodiment, the program may be used by or in combination with an instruction execution system, an apparatus, or a device.

In one embodiment, the computer-readable signal medium may include data signals propagated in the baseband or as a part of carrier, wherein computer readable program codes are carried. In a further embodiment, such propagated data signals may assume a plurality of forms, including, but not limited to, electro-magnetic signals, optical signals, or any appropriate combination of the above. In a further embodiment, the computer readable signal medium may also be any computer readable medium other than the computer readable storage medium. In a further embodiment, the computer readable medium may send, propagate or transmit a program used by or in combination with an instruction executing system, apparatus or device.

In a further embodiment, the program code embodied/represented in the computer readable medium may be transmitted using any appropriate medium, including, but not limited to, radio, wire, cable, RF, etc., or any appropriate combination of the above.

In one embodiment, a computer program code for executing the operations of the present disclosure may be compiled by one or more program design languages or a combination thereof. In a further embodiment, the program design languages may include an object oriented programming language such as Java, Smalltalk, C++ or the like, and conventional procedural programming languages, such as the "C" programming language or similar programming languages. In a further embodiment, the program code may be executed entirely on the user's computer, partly on the user's computer, as a stand-alone software package, partly on the user's computer and partly on a remote computer or entirely on the remote computer or server. In a further embodiment, in a scenario of a remote computer, the remote computer may be connected to the user's computer through any type of network, including a local area network (LAN) or a wide area network (WAN), or the connection may be made to an external computer (for example, through the Internet using an Internet Service Provider).

In one embodiment, each block in the flowcharts and/or block diagrams and a combination of respective blocks in the flowcharts and/or block diagrams may be implemented by computer program instructions. In a further embodiment, these computer program instructions may be provided to a processor of a general-purpose computer, a dedicated computer, or other programmable data processing apparatus, thereby producing a machine. In a further embodiment, these computer program instructions may be executed through a computer or other programmable data processing apparatus, thereby producing an apparatus for performing the functions/operations specified in the blocks of the flowcharts and/or block diagrams.

In one embodiment, these computer readable program instructions may also be stored in a computer readable storage medium that may direct a computer or other programmable data processing apparatus to function in a particular manner, such that the instructions stored in the computer readable medium may produce an article of manufacture including instruction means which may implement the functions/operations specified in the flowchart and/or block diagram block or blocks.

In one embodiment, the computer readable program instructions may also be loaded onto a computer, other programmable data processing apparatus, or other device to cause a series of operational steps that may be performed on the computer, other programmable apparatus or other device to produce a computer implemented process, such that the instructions which may executed on the computer, other programmable apparatus, or other device implement the functions/operations specified in the flowchart and/or block diagram block or blocks In one embodiment, the flowchart and block diagrams in the figures may illustrate the architecture, functionality, and operation of possible implementations of systems, methods and computer program products according to various embodiments of the present disclosure. In a further embodiment, each block in the flowchart or block diagrams may represent a module, segment, or portion of code, which may include one or more executable instructions for implementing the specified logical function(s). In a further embodiment, wherein some alternative implementations may be considered, the functions noted in the block may occur out of the order noted in the figures. In a further exemplary embodiment, two blocks shown in succession may, in fact, be executed substantially concurrently, or the blocks may sometimes be executed in the reverse order, depending upon the functionality that may be involved. In a further embodiment, it may also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein may be chosen to best explain the principles of the embodiments, the practical application or technical improvement over technologies found in the marketplace, or to enable others of ordinary skill in the art to understand the embodiments disclosed herein.

What is claimed is:

1. A method for determining a failure location in a storage system, the method comprising:
    obtaining by an obtaining unit, from a disk management system, performance information of a disk, wherein the performance information indicates an abnormal disk performance;
    in response to the performance information indicating that at least one or more performance indices exceed a corresponding predetermined threshold:
        retrieving, by the failure diagnostic unit, health condition information of the disk from the disk,
        determining, by the failure diagnostic unit, whether a health condition of the disk is normal based on both
            i) the at least one or more performance indices, and
            ii) health condition information of the disk retrieved in response to the one or more performance indices exceeding the corresponding predetermined threshold, wherein the failure diagnostic unit determines that the health condition of the disk is normal in response to detecting that both
  i) the performance indices exceeding the predetermined threshold are irrelevant to the health condition of the disk, and
  ii) the retrieved health condition information of the disk indicates nothing abnormal; and
in response to determining, by the failure diagnostic unit, that the health condition of the disk is normal despite the performance information indicating the abnormal disk performance, determining, by the failure diagnostic unit, a failure location of at least one or more elements in a communication path of the disk, wherein a storage system backend connection structure comprises the communication path, and wherein failing the disk unnecessarily is avoided, by the failure diagnostic unit, by the determining the failure location.

2. The method according to claim 1, further comprises:
obtaining health condition information of the at least one or more elements in the communication path of the disk; and
in response to the health condition information of at least one element in the communication path being abnormal, determining that the at least one element failed.

3. The method according to claim 1, further comprising: determining that the disk fails, when the at least one or more performance indices associated with the health condition of the disk, and/or the health condition information of the disk is detected to be abnormal.

4. The method according to claim 1, further comprises periodically executing, manually triggering, triggering in response to detecting an I/O performance abnormality with the disk, or triggering in response to a reception of an information reporting of a disk I/O failure.

5. The method according to claim 4, wherein the disk I/O failure information is reported by a disk array RAID.

6. The method according to claim 1, wherein the at least one or more performance indices include at least one or more of the following from the group consisting of: an I/O error count, an average I/O delay, a data error, a reallocated sector count, a SAS G-list count, and a SAS background media scan information.

7. The method according to claim 1, wherein the health condition information comprises at least one of a historical health condition information and a current health condition information.

8. The method according to claim 1, wherein the health condition information is reported using Self-Monitoring Analysis and Reporting Technology (S.M.A.R.T).

9. The method of claim 1, wherein the failure diagnostic unit determines that the health condition of the disk is normal in response to detecting that both:
  i) the performance indices exceeding the performance indices comprise an I/O error count, and
  ii) retrieved Self-Monitoring Analysis and Reporting Technology (S.M.A.R.T) health condition information of the disk indicates nothing abnormal.

10. An apparatus for determining a failure location in a storage system, the apparatus configured to:
obtain by an obtaining unit, from a disk management system, performance information of a disk, wherein the performance information indicates an abnormal disk performance;
in response to the performance information indicating that at least one or more performance indices exceed a corresponding predetermined threshold:
retrieve, by the failure diagnostic unit, health condition information of the disk from the disk,
determine, by the failure diagnostic unit, whether a health condition of the disk is normal based on both
  i) the at least one or more performance indices, and
  ii) health condition information of the disk retrieved in response to the one or more performance indices exceeding the corresponding predetermined threshold, wherein the failure diagnostic unit determines that the health condition of the disk is normal in response to detecting that both
  i) the performance indices exceeding the predetermined threshold are irrelevant to the health condition of the disk, and
  ii) the retrieved health condition information of the disk indicates nothing abnormal; and
in response to a determination, by the failure diagnostic unit, that the health condition of the disk is normal despite the performance information indicating the abnormal disk performance, determine, by the failure diagnostic unit, a failure location of at least one or more elements in a communication path of the disk, wherein a storage system backend connection structure comprises the communication path, and wherein failing the disk unnecessarily is avoided, by the failure diagnostic unit, by the determining the failure location.

11. The apparatus according to claim 10, further configured to:
obtain health condition information of the at least one or more elements in the communication path in sequence of the disk; and
in response to the health condition information of the at least one element In the communication path being abnormal, determine that the at least one element failed.

12. The apparatus according to claim 10, further configured to:
determine that the disk fails, when the at least one or more performance indices associated with the health condition of the disk, and/or the health condition information of the disk is detected to be abnormal.

13. The apparatus according to claim 10, further configured to periodically executed, manually trigger, trigger in response to detection of an I/O performance abnormality with the disk, or trigger in response to reception of an information reporting of a disk I/O failure.

14. The apparatus according to claim 13, wherein the disk I/O failure information is reported by a disk array RAID.

15. The apparatus according to claim 10, wherein the at least one or more performance indices include at least one or more of the following from a group consisting of: an I/O error count, an average I/O delay, a data error, a reallocated sector count, a SAS G-list count, and a SAS background media scan information.

16. The apparatus according to claim 10, wherein the health condition information comprises at least one of a historical health condition information and a current health condition information.

17. The apparatus according to claim 10, wherein the health condition information is reported using Self-Monitoring Analysis and Reporting Technology (S.M.A.R.T).

18. A computer program product for determining a failure location in a storage system, the computer program product being tangibly stored on a non-transient computer-readable medium and comprising machine executable instructions which, when executed, cause the machine to perform steps of:
obtaining by an obtaining unit, from a disk management system, performance information of a disk, wherein the performance information indicates an abnormal disk performance;
in response to the performance information indicating that at least one or more performance indices exceed a corresponding predetermined threshold:
retrieving, by the failure diagnostic unit, health condition information of the disk from the disk,
determining, by the failure diagnostic unit, whether a health condition of the disk is normal based on both
  i) the at least one or more performance indices, and
  ii) health condition information of the disk retrieved in response to the one or more performance indices exceeding the corresponding predetermined threshold, wherein the failure diagnostic unit determines that the health condition of the disk is normal in response to detecting that both
    i) the performance indices exceeding the predetermined threshold are irrelevant to the health condition of the disk, and
    ii) the retrieved health condition information of the disk indicates nothing abnormal further comprising,
wherein the health condition information comprises at least one of a historical health condition information and a current health condition information; and
in response to determining, by the failure diagnostic unit, that the health condition of the disk is normal despite the performance information indicating the abnormal disk performance, determining, by the failure diagnostic unit, a failure location of at least one or more elements in a communication path of the disk, wherein a storage system backend connection structure comprises the communication path, and wherein failing the disk unnecessarily is avoided, by the failure diagnostic unit, by the determining the failure location.

19. The computer program product according to claim 18, the steps further comprising:
determining that the disk fails, when the at least one or more performance indices associated with the health condition of the disk, and/or the health condition information of the disk is detected to be abnormal;
periodically executing, manually triggering, triggering in response to detecting an I/O performance abnormality with the disk, or triggering in response to a reception of an information reporting of a disk I/O failure, the disk I/O failure information reported by a disk array RAID.

* * * * *